Oct. 4, 1966  E. M. SALIBA  3,276,329
MACHINE TOOLS
Filed July 1, 1965  2 Sheets-Sheet 1

Inventor
Edward M. Saliba
by Roberts, Cushman & Grover
Atty

United States Patent Office 3,276,329
Patented Oct. 4, 1966

3,276,329
MACHINE TOOLS
Edward M. Saliba, Andover, Mass., assignor to American Science and Engineering, Inc., Cambridge, Mass., a corporation of Massachusetts
Filed July 1, 1965, Ser. No. 468,904
20 Claims. (Cl. 90—17)

This invention relates to machine tools, and in particular, to boring, milling and drilling machines, although it is to be understood that the advantages achieved by its design, as will appear hereinafter, may be employed in other machine tools where it is desirable to be able to perform simple boring, milling, drilling and other cutting operations on inclined and curved surfaces without difficult and time-consuming adjustments of the work support and/or the tool support.

The objects of this invention are to provide a structure, of the kind embodying a base on which there is a work support and a tool-supporting pedestal confronting the work support on which there is mounted a headstock for supporting a driving spindle, constructed and arranged to enable positioning the axis of the driving spindle perpendicular to an inclined surface or to the point of tangency of a curved surface of a workpiece mounted on the work support; to provide a structure which will enable accomplishing the foregoing easily and quickly which includes tilting the pedestal toward and away from the work support; to provide a structure embodying tilting of the pedestal relative to the work support without sacrifice in precision of the machine operation; to provide the structure which enables tilting the pedestal with indicating means to visibly indicate the angular disposition of the pedestal; and to provide a structure which is relatively inexpensive to manufacture.

As herein illustrated, the machine comprises a base, a work support, a pedestal confronting the work support for supporting a tool for operation on a part mounted on the work support, and means spaced from the work support supporting the pedestal at its foot in an upright position for tilting in a plane which is perpendicular to the base and at right angles to the line of confrontation; characterized in that the aforesaid means comprises a rigid elongate beam disposed with its longitudinal axis in said plane and supported intermediate its ends with one end adjacent the work support and its other end remote therefrom for tilting about an axis parallel to said line of confrontation. The pedestal is secured at its foot to the one end of the beam with its longitudinal axis intersecting the axis of tilt and there is means on the base at the remote end of the beam cooperable therewith to effect elevation and depression of the beam and to guide the beam during movement to prevent lateral deviation from the plane. The base has vertically stepped, spaced parallel surfaces constituting a horizontal work-supporting surface and a horizontal tool-supporting surface and there is means mounted on the latter surface in the form of a bearing disposed transversely of the base with its axis parallel to the line of confrontation on which the beam is supported for rotation about an axis situated below the surface of the work support to enable tilting the pedestal forwardly and rearwardly at angles inclined toward and away from the work support. The beam has on it tracks parallel to its axis of tilt and the foot of the pedestal is mounted on the tracks for movement transversely of the support, that is, lengthwise of the axis of tilt. At the remote end of the beam there is a guide on the base with which the remote end of the beam is cooperable to constrain lateral movement of the beam while permitting elevation and depression of the remote end for tilting of the beam. The guide contains in the preferred form of the invention spaced rearwardly converging walls and the remote end of the beam has a complementary shaped part interengaged with the recess. The guide is adjustable initially longitudinally to the beam to bring the mating portions of the guide and beam into intimate engagement. A screw is fastened at its lower end to the base and is threaded through a nut mounted on the beam so that rotation of the nut on the screw will raise or lower the beam. The nut is in the form of a worm wheel containing a central threaded hole for threaded engagement with the screw and peripheral teeth for engagement with a worm shaft, and a worm shaft is mounted on the beam in engagement with the worm wheel for effecting rotation of the worm wheel. The worm wheel is pivotally supported for movement about an axis parallel to the axis of rotation of the worm wheel and a motor is mounted for movement therewith and is connected thereto to effect such rotation.

The invention will now be described in greater detail with reference to the accompanying drawings wherein.

Figure 1:
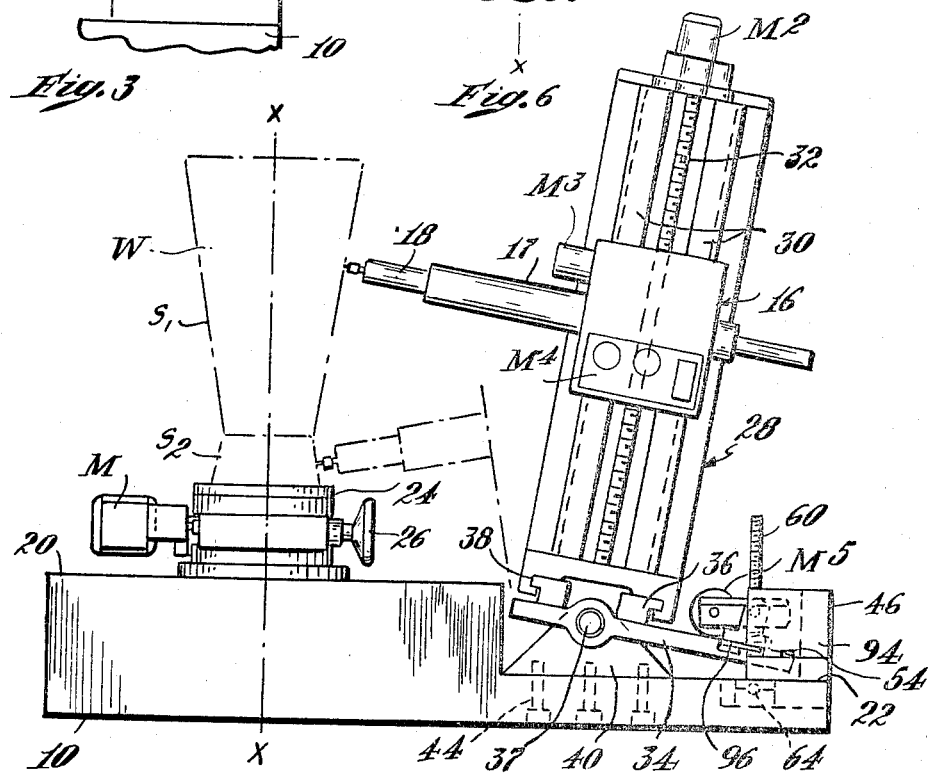
FIG. 1 is an elevation of the machine showing the tool support tilted away from the work for operating on a surface which inclines upwardly and toward the tool support and in dotted lines inclined toward the work support for operating on a surface which inclines downwardly and toward the tool support.

The machine comprises a base 10 on which is mounted a work support 12 and a tool support 14, the latter in turn having mounted on it a headstock 16. The headstock as illustrated in FIG. 1 supports a quill in which is journaled a driving spindle 18 with its axis coinciding with that of the quill. Alternatively in FIG. 6 the quill has on it an attachment 19 for supporting a driving spindle 18a with its axis at right angles to the axis of the quill.

Figure 2:
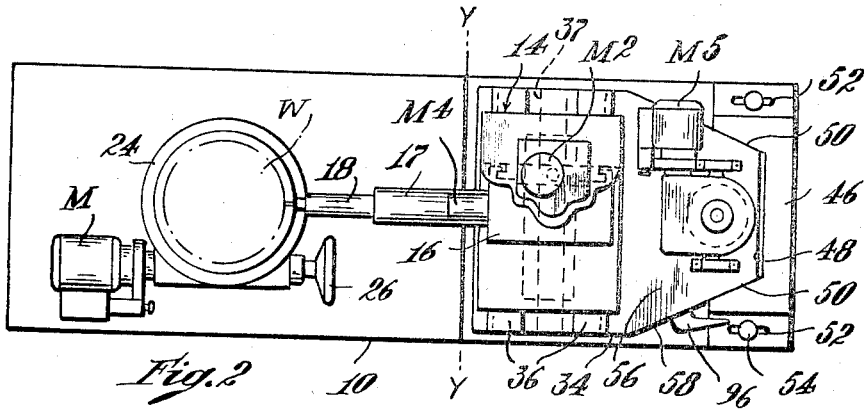
FIG. 2 is a plan view of FIG. 1.

The base 10 is of substantially rectangular configuration as viewed from the top (FIG. 2), and has stepped, vertically spaced parallel surfaces 20 and 22 for receiving, respectively, the work support 12 and the tool support 14.

The work support 12 is of conventional design and is herein shown in the form of a circular table 24 mounted on the surface 20 and provided with means for rotating about a vertical axis and indexing its rotation relative to the tool, illustrated herein without further description by the motor M and the hand wheel 26. The table is adapted to support a workpiece such as shown at w (FIGS. 1 and 6) so that it may be rotated about a perpendicular axis represented by the line X—X to present the desired portions of its inclined surfaces S1 and S2, FIG. 1 or its curved surface S3, FIG. 6, to the tool.

The tool support takes the form of a pedestal 28 of generally rectangular cross-section which has mounted on one side spaced parallel tracks 30—30 on which is slidably mounted the headstock 16, so that the latter can be moved up and down the pedestal. A screw 32 threaded through the headstock and journaled at its ends in the upper and lower ends of the pedestal provides for moving the headstock up and down. The upper end of the screw is operatively connected to a motor M2 to enable power elevation of the headstock.

Figures 3, 6:
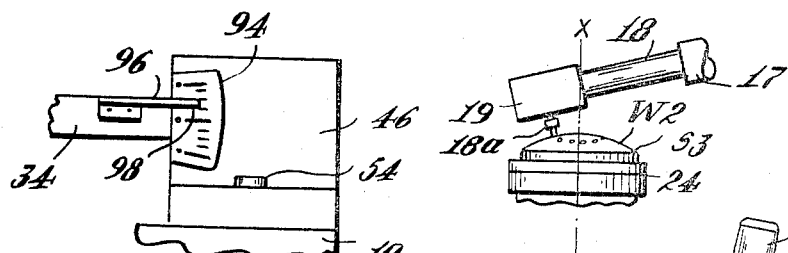
FIG. 3 is a fragmentary elevation at the remote end of the beam showing the indicator.
FIG. 6 is an elevation similar to FIG. 1 showing the support tilted toward the work and provided with an attachment for operating on a curved surface.

A motor M3 is provided for effecting axial movement of the quill and a motor M4 is provided for effecting rotation of the spindle about its longitudinal axis. When the attachment 19 is employed as shown in FIG. 6 a suitable driving connection is provided between spindle 18 and the spindle 18a.

In accordance with this invention, the pedestal 14 is mounted on the base 10 in confronting relation to the work support 12 for tilting toward and away from the work-supporting table 24 about an axis parallel to the line of confrontation represented by the line Y—Y (FIG. 2) and in a plane perpendicular to the base. The lower end or foot of the pedestal is mounted for this purpose on a rigid elongate beam 34 pivotally supported intermediate its ends on the surface 22 of the base. To enable traversing the pedestal widthwise of the support, that is, parallel to the line of confrontation, spaced parallel tracks 36—36 are secured to the upper side of the beam for engagement with spaced parallel grooves 38—38 at the foot of the pedestal.

The beam 34 is pivotally supported with one end adjacent the work support and its other end remote therefrom on a horizontally disposed shaft 37 of relatively large diameter and stiffness supported with its axis parallel to the line of confrontation below the surface 20 and above the surface 22 by spaced bracket members 40—40 in which the ends of the shaft are fixed. The bracket members 40—40 are fastened to the base by bolts 44. The remote end of the beam has a part 56 provided with rearwardly converging edges 58—58 and there is a guide block containing a recess for receiving the part 56 having transversely spaced walls 50—50 which are cooperable therewith to prevent lateral displacement or deviation of the beam during tilting movement.

Walls 50—50 are symmetrical with respect to the longitudinal centerline of the beam and are generated to provide a double compound curved surface which will have intimate bearing contact with the distal end of the beam throughout its tilting movement above and below the horizontal. The guide block 46 has at opposite ends spaced flanges containing elongate slots 52—52 through which are inserted screw bolts 54 which enable initially adjusting the block on the base when the beam is in a horizontal position into intimate contact with the remote end of the beam.

Figure 4:
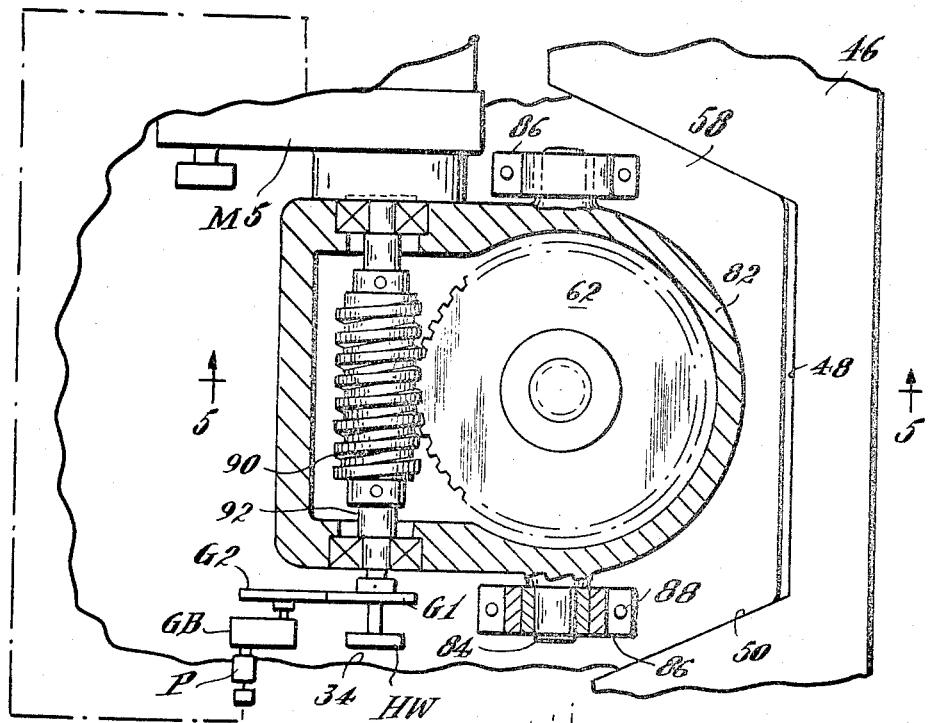
FIG. 4 is a horizontal section showing the details of the mechanism for effecting tilting movement of the tool support.
Figure 5:
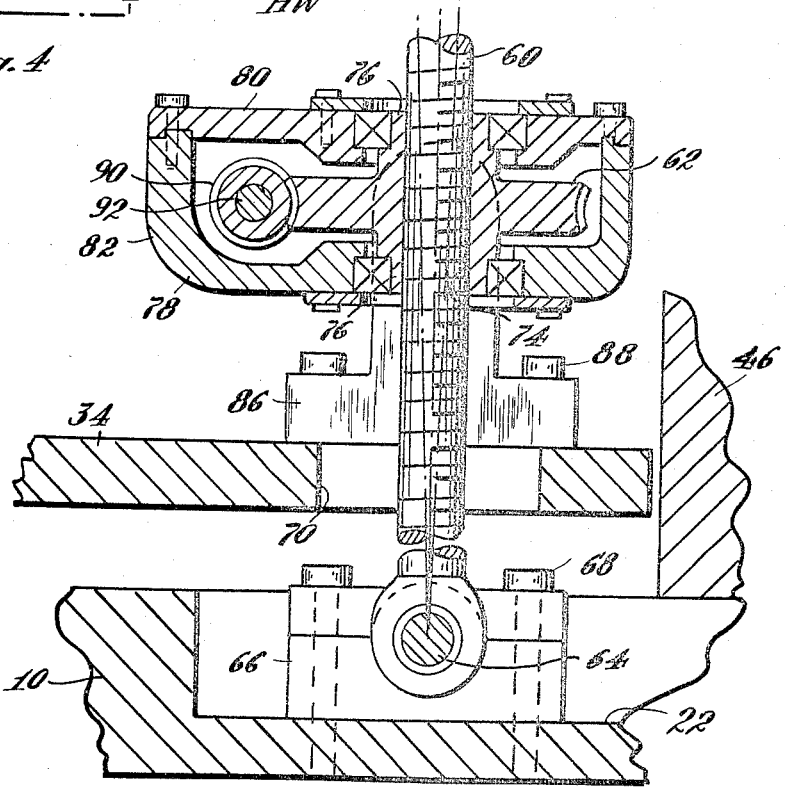
FIG. 5 is a vertical section taken on the line 5—5 of FIG. 4.

To enable tilting of the beam 34 there is provided, as shown in FIGS. 4 and 5, a traversing screw 60 and a combination nut and worm wheel 62. The screw is pivotally mounted at its lower end on a bearing pin 64, the opposite ends of which are secured in bracket blocks 66—66 fastened to the base by screws 68. The beam 34 contains a hole 70 through which the screw 60 passes to the upper side and the combination nut and worm wheel contains a threaded opening 74 through which the screw is threaded. The combination nut and worm wheel has at its lower and upper sides hubs 76—76 by means of which it is journaled for rotation about the axis of the screw in the lower and upper walls 78 and 80 of a housing 82. The housing has laterally extending trunnions 84—84, the axes of which pass through the center of the worm wheel and are journaled in brackets 86—86 fastened by bolts 88 to the upper side of the beam. The housing is thus tiltable about an axis which is parallel to the axis of the shaft 37 and intersects the axis of the screw. A worm 90 is supported on a shaft 92 in the housing in engagement with the worm wheel, the ends of the shaft being journaled in the walls of the housing. One end of the worm shaft 92 is connected to a motor M5 mounted on the wall of the housing so as to be tiltable with the housing and provides for rotating the worm and hence the worm wheel on the screw so as to effect elevation or depression of the beam depending upon the direction of rotation of the worm wheel. The motor M5 is reversible and provided with control means to enable automatic setting of the angle of tilt. This is provided for by meshing gears G1–G2, the gear G1 being fixed to an extension of the worm shaft 92. The gear G2 through a gear box GB is operative to change the resistance in a potentiometer P which in turn may be connected to a servo operatively connected to the motor to control its direction and extent of operation. The foregoing parts are shown diagrammatically since they are conventional. A handwheel HW may be secured to the worm shaft 92 to enable manual setting of the tilt if desired.

To visually indicate the angular disposition of the pedestal at any time, one end of the guide block 46 (FIG. 3) has on it a graduated scale 94 and a pointer 96 is fastened to the beam at that side in a position such that its end 98 will move along the scale as the beam is tilted. The potentiometer may be provided with an indicator in conjunction with the scale 94 so that by setting the indicator at a predetermined point on the scale the motor will be caused to rotate the screw to position the pedestal at a corresponding position.

No provision is required for locking the pedestal in a given position other than the interengagement of the screw with the worm wheel and the worm wheel with the worm.

As provided in FIG. 1, it is possible to tilt the pedestal either away from the work support, as shown in solid lines (FIG. 1) to position the longitudinal axis of the driving spindle 18 perpendicular to the surface S1 or, as shown in dotted lines, to position the axis of the spindle at right angles to the surface S2. In either of the two positions illustrated, the disposition of the pedestal parallel to the surface to be operated on enables preserving the right angular position of the spindle for movement up and down the column and for movement transversely of the column thus eliminating the necessity for making special adjustments of the work on the work support or providing special mounting for the tool driving spindle 18. This, of course, simplifies the construction of the machine, permitting use of readily available machine parts in its construction.

As provided in FIG. 6, it is possible by tilting the pedestal and moving the quill axially to position the spindle 18a perpendicular to the point of tangency of the tool with a curved surface S3 of the workpiece w. This enables forming a series of holes on the curved surface equidistance from the common center by the simple expedient of rotating the work support.

While the support described above is particularly useful for drilling and boring operations, it is within the scope of this invention to use it wherever it expedites machining operation by eliminating complex mountings which are time-consuming, expensive and difficult to make.

It should be understood that the present disclosure is for the purpose of illustration only and that this invention includes all modifications and equivalents which fall within the scope of the appended claims.

I claim:
1. In a machine tool, a base, a work support, a pedestal confronting the work support for supporting a tool for operating on a part mounted on the work support, and means at the foot of the pedestal supporting it on the base in an upright position for tilting toward and away from the work support in a plane which is perpendicular to the base and at right angles to the line of confrontation; characterized in that said means comprises a rigid elongate beam disposed with its longitudinal axis in said plane and supported intermediate its ends with one end adjacent the work support and its other end remote therefrom for tilting about an axis parallel to said line of confrontation, said pedestal being secured at its foot to said one end of the beam with its longitudinal axis intersecting the axis of tilt, and means on the base at the remote end of the beam cooperable therewith to effect elevation and depression of the beam and to guide the beam during movement to prevent lateral deviation from said plane.

2. A machine tool according to claim 1 wherein there is means on the pedestal supporting the tool thereon for movement longitudinally of an axis normal to the axis of the pedestal and situated in the plane of tilt for rotation about said axis.

3. A machine tool according to claim 1 wherein there is means on the pedestal supporting the tool thereon for movement longitudinally of an axis normal to the axis of the pedestal and situated in the plane of tilt for rotation about an axis perpendicular to said normal axis.

4. A machine tool according to claim 1 wherein a quill is mounted on the pedestal with its axis situated in the plane of tilt and normal to the axis of the pedestal for movement along its axis and the tool is mounted in the quill for rotation about an axis coinciding with the axis of the quill.

5. A machine tool according to claim 1 wherein a quill is mounted on the pedestal with its axis situated in the plane of tilt and normal to the axis of the pedestal for movement along its axis and the tool is mounted on the quill for rotation about an axis perpendicular to the axis of the quill.

6. In a machine tool, a base, a work support, a pedestal confronting the work support for supporting a tool for operating on a part mounted on the work support, and means at the foot of the pedestal supporting it on the base in an upright position for tilting toward and away from the work support in a plane which is perpendicular to the base and at right angles to the line of confrontation; characterized in that said means comprises a rigid elongate beam disposed with its longitudinal axis in said plane, a bearing disposed transversely of the base with its axis parallel to said line of confrontation, on which the beam is pivotally supported with one end adjacent the support and the other end remote therefrom, means securing the foot of the pedestal to the beam with its longitudinal axis perpendicular to and intersecting the axis of the beam, and means on the base at the remote end of the beam operable to tilt the beam and to constrain the opposite sides of the beam against lateral movement throughout its tilting movement.

7. In a machine tool, a base having vertically stepped, spaced parallel surfaces constituting, respectively, a horizontal work-supporting surface for a work-supporting table and a horizontal tool-supporting surface for a tool-supporting pedestal, and means on the horizontal tool-supporting surface supporting the pedestal in confronting relation to the work-supporting surface for tilting movement toward and away from the work-supporting table about an axis at its foot which is parallel to the line of confrontation, characterized in that said means comprises a rigid elongate beam, a bearing shaft, a pair of transversely spaced bearing blocks fixed to said tool-supporting surface in which the opposite ends of the bearing shaft are journaled, said foot of the pedestal being supported by that part of the bearing shaft between said bearing blocks, and means on said tool-supporting surface at the remote end of the beam operable to guide the beam against lateral movement and to effect tilting movement thereof.

8. A machine tool according to claim 7 further characterized in that a track is mounted on the beam and the foot of the pedestal is mounted on the beam by means of the track to tilt with the beam and to be moved transversely relative to the base.

9. A machine tool according to claim 7 further characterized in that the axis of the bearing shaft is situated below the plane of the surface of the work support.

10. In a machine tool, a base, a work support, a pedestal confronting the work support for supporting a tool for operating on a part mounted on the work support, and means at the foot of the pedestal supporting it on the base in an upright position for tilting toward and away from the work support in a plane which is perpendicular to the base and at right angles to the line of confrontation; characterized in that said means comprises a rigid elongate beam disposed with its longitudinal axis in said plane and supported intermediate its ends with one end adjacent the work support and its other remote therefrom for tilting about an axis parallel to said line of confrontation, said pedestal being secured at its foot to said one end of the beam with its longitudinal axis intersecting the axis of tilt, transversely spaced rigid guide surfaces on the base, transversely spaced guide surfaces at the remote end of the beam interengaged with said guide surfaces on the base, said interengaged guiding surfaces supporting the beam against lateral deviation, and means on the beam and base operable to effect tilting movement of the beam.

11. In a machine tool, a base, a work support, a pedestal confronting the work support for supporting a tool for operating on a part mounted on the work support, and means at the foot of the pedestal supporting it on the base in an upright position for tilting toward and away from the work support in a plane which is perpendicular to the base and at right angles to the line of confrontation; characterized in that said means comprises a rigid elongate beam disposed with its longitudinal axis in said plane and supported intermediate its ends with one end adjacent the work support and with its other end remote therefrom for tilting about an axis parallel to said line of confrontation, said pedestal being secured at its foot to said one end of the beam with its longitudinal axis intersecting the axis of tilt, transversely spaced, rearwardly converging guiding surfaces perpendicular to the base at the remote end of the beam, correspondingly converging guiding surfaces at the remote end of the beam interengaged with said guide surfaces on the base, said interengaged surfaces constraining lateral deviation of the beam, and means on the base and beam cooperable to effect tilting.

12. In a machine tool, a base, a work support, a pedestal confronting the work support for supporting a tool for operating on a part mounted on the work support, and means at the foot of the pedestal supporting it on the base in an upright position for tilting toward and away from the work support in a plane which is perpendicular to the base and at right angles to the line of confrontation; characterized in that said means comprises a rigid elongate beam disposed with its longitudinal axis in said plane and supported intermediate its ends with one end adjacent the work support and with its other end remote therefrom for tilting about an axis parallel to said line of confrontation, said pedestal being secured at its foot to said one end of the beam with its longitudinal axis intersecting the axis of tilt, a recessed guide block mounted on the base at the remote end of the beam with which the remote end of the beam mates for guiding the beam in movement, said guiding block being adjustable on the base longitudinally of the beam to effect such interengagement of the block and beam as to eliminate side play, and means on the block and beam cooperable to effect tilting of the beam.

13. In a machine tool, a base, a work support, a pedestal confronting the work support for supporting a tool for operating on a part mounted on the work support, and means at the foot of the pedestal supporting it on the base in an upright position for tilting toward and away from the work support in a plane which is perpendicular to the base and at right angles to the line of confrontation; characterized in that said means comprises a rigid elongate beam disposed with its longitudinal axis in said plane and supported intermediate its ends with one end adajcent the work support and its other end remote therefrom for tilting about an axis parallel to said line of confrontation, said pedestal being secured at its foot to said one end of the beam with its longitudinal axis intersecting the axis of tilt, and means comprising a screw and nut mounted on the base and beam at the remote end of the beam in interengagement, operable to effect tilting of the beam relative to the base and to support the beam rigidly in the selected position of elevation.

14. A machine tool according to claim 13 wherein there is manually operative means for effecting rotation of the nut.

15. In a machine tool, a base, a work support, a pedestal confronting the work support for supporting a tool for operating on a part mounted on the work support, and means at the foot of the pedestal supporting it on the base in an upright position for tilting toward and away from the work support in a plane which is perpendicular to the base and at right angles to the line of confrontation; characterized in that said means comprises a rigid elongate beam disposed with its longitudinal axis in said plane and supported intermediate its ends with one end adjacent the work support and its other end remote therefrom for tilting about an axis parallel to said line of confrontation, said pedestal being secured at its foot to said one end of the beam with its longitudinal axis intersecting the axis of tilt, and means comprising a screw pivotally secured at its lower end to the base and a nut mounted on the beam with which the screw is threadably engaged, said nut being rotatable to traverse the screw and hence move the beam in elevation relative to the base.

16. In a machine tool, a base, a work support, a pedestal confronting the work support for supporting a tool for operating on a part mounted on the work support, and means at the foot of the pedestal supporting it on the base in an upright position for tilting toward and away from the work support in a plane which is perpendicular to the base and at right angles to the line of confrontation; characterized in that said means comprises a rigid elongate beam disposed with its longitudinal axis in said plane and supported intermediate its ends with one end adjacent the work support and its other end remote therefrom for tilting about an axis parallel to said line of confrontation, said pedestal being secured at its foot to said one end of the beam with its longitudinal axis intersecting the axis of tilt, and means comprising a screw pivotally secured at its lower end to the base, a part rotatably mounted on the beam containing a threaded central hole through which the screw is threaded, said part having a peripheral edge for engagement with a worm shaft, and a worm shaft mounted on the beam in engagement with said peripheral edge of the part operable to rotate the part.

17. In a machine tool, a base, a work support, a pedestal confronting the work support for supporting a tool for operating on a part mounted on the work support, and means at the foot of the pedestal supporting it on the base in an upright position for tilting toward and away from the work support in a plane which is perpendicular to the base and at right angles to the line of confrontation; characterized in that said means comprises a rigid elongate beam disposed with its longitudinal axis in said plane and supported intermediate its ends with one end adjacent the work support and its other end remote therefrom for tilting about an axis parallel to the line of confrontation, said pedestal being secured at its foot to said one end of the beam with its longitudinal axis intersecting the axis of tilt, and means comprising a screw pivotally secured at its lower end to the base, a worm wheel rotatably supported on the beam, said worm wheel containing a threaded central hole through which the screw is threaded, a worm shaft rotatably supported on the beam in engagement with the worm wheel, a motor mounted on the beam, and means operably connecting the motor to the worm shaft for effecting power movement of the beam.

18. A machine tool according to claim 17 wherein there is a potentiometer connected to the worm shaft which may be set to a predetermined position corresponding to the predetermined tilt of the pedestal and a servo operable thereby to control operation of the motor.

19. In a machine tool, a base, a work support, a pedestal confronting the work support for supporting a tool for operating on a part mounted on the work support, and means at the foot of the pedestal supporting it on the base in an upright position for tilting toward and away from the work support in a plane which is perpendicular to the base and at right angles to the line of confrontation; characterized in that said means comprises a rigid elongate beam disposed with its longitudinal axis in said plane and supported intermediate its ends with one end adjacent the work support and its other end remote therefrom for tilting about an axis parallel to the line of confrontation, said pedestal being secured at its foot to said one end of the beam with its longitudinal axis intersecting the axis of tilt, and means comprising a bearing pin secured to the base, a screw pivotally journaled at its lower end on said pin, said beam containing a hole through which the screw extends upwardly through the beam from the underside to the upper side with sufficient clearance to enable tilting of the beam without binding on the screw, a worm wheel threaded onto the upwardly extending end of the screw, a worm shaft, means pivotally supporting the worm shaft in engagement with the worm wheel for pivotal movement about an axis parallel to the axis of the worm shaft and passing through the center of the worm wheel, and a motor secured to the last-named means and operably connected to the worm shaft to effect rotation thereof.

20. In a machine tool, a base, a work support, a pedestal confronting the work support for supporting a tool for operating on a part mounted on the work support, and means at the foot of the pedestal supporting it on the base in an upright position for tilting toward and away from the work support in a plane which is perpendicular to the base and at right angles to the line of confrontation; characterized in that said means comprises a rigid elongate beam disposed with its longitudinal axis in said plane and supported intermediate its ends with one end adjacent the work support and its other end remote therefrom for tilting about an axis parallel to the line of confrontation, said pedestal being secured at its foot to said one end of the beam with its longitudinal axis intersecting the axis of tilt, and means comprising a screw pivotally secured at its lower end to the base, said beam containing a hole through which the screw passes, a worm wheel threaded onto the screw, a housing within which the worm wheel is rotatably journaled for rotation about its center on the axis of the screw, bearings supporting the housing on the base for tilting about an axis parallel to the beam and passing through the center of the worm wheel, a worm shaft journaled in the housing in engagement with the worm wheel, and a motor operably connected to the worm shaft, said motor being mounted on the housing and being tiltable therewith.

No references cited.

WILLIAM W. DYER, Jr., *Primary Examiner.*

G. A. DOST, *Assistant Examiner.*